US010753310B2

(12) United States Patent
Azevedo et al.

(10) Patent No.: US 10,753,310 B2
(45) Date of Patent: Aug. 25, 2020

(54) PISTON WITH ENHANCED COOLING GALLERY

(75) Inventors: Miguel Azevedo, Ann Arbor, MI (US); Keith Hampton, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 1100 days.

(21) Appl. No.: 13/370,645

(22) Filed: Feb. 10, 2012

(65) Prior Publication Data
US 2013/0206095 A1 Aug. 15, 2013

(51) Int. Cl.
*F02F 3/22* (2006.01)
*F16J 1/09* (2006.01)
*F16J 9/02* (2006.01)
*F16J 9/22* (2006.01)

(52) U.S. Cl.
CPC ...... *F02F 3/22* (2013.01); *F16J 1/09* (2013.01); *F16J 9/02* (2013.01); *F16J 9/22* (2013.01)

(58) Field of Classification Search
CPC . F02F 3/22; F16J 1/09; F16J 9/02; F16J 9/22
USPC ............................................ 123/41.35, 193.6
See application file for complete search history.

(56) References Cited

U.S. PATENT DOCUMENTS

| | | | |
|---|---|---|---|
| 1,492,397 | A | 4/1924 | Roberts |
| 1,678,957 | A | 7/1928 | Philipp |
| 1,737,056 | A | 11/1929 | Mueller |
| 1,876,917 | A | 9/1932 | Gosslau |
| 1,885,755 | A | 11/1932 | Nonnenbruch |
| 2,566,603 | A | 9/1951 | De Dykes |
| 3,053,595 | A * | 9/1962 | Dilworth ............... F16J 1/16 403/230 |
| 3,542,376 | A | 11/1970 | Dykehouse |
| 3,545,341 | A | 12/1970 | Fischer |
| 4,306,489 | A * | 12/1981 | Driver ................ F02F 3/12 123/193.6 |
| 4,346,685 | A | 8/1982 | Fujikawa |

(Continued)

FOREIGN PATENT DOCUMENTS

| | | |
|---|---|---|
| CN | 1610601 A | 4/2005 |
| CN | 101680394 A | 3/2010 |

(Continued)

OTHER PUBLICATIONS

International Search Report, dated Jun. 26, 2013 (PCT/US2013/025283).

*Primary Examiner* — Hung Q Nguyen
(74) *Attorney, Agent, or Firm* — Robert L. Steams; Dickinson Wright, PLLC

(57) ABSTRACT

A piston for an internal combustion engine is provided. The piston includes a body having a cylindrical outer surface with a ring belt region including an annular uppermost ring groove and a lower ring groove extending into the outer surface. A top land extends from the uppermost ring groove to an upper combustion surface. The body has a pair of pin bosses with pin bores aligned with one another along a pin bore axis. A first piston ring is disposed in the uppermost ring groove and a second piston ring is disposed in the lower ring groove. The body has an annular sealed cooling gallery with a cooling medium contained therein. The sealed cooling gallery is configured in substantial radial alignment between the first and second piston rings to provide optimal cooling to the ring belt region, top land and upper combustion surface.

17 Claims, 3 Drawing Sheets

(56) References Cited

U.S. PATENT DOCUMENTS

| | | | | |
|---|---|---|---|---|
| 4,409,947 | A * | 10/1983 | Yanagihara | F02M 26/41 123/193.6 |
| 4,572,058 | A * | 2/1986 | Hinz | F16J 1/16 123/193.6 |
| 4,669,369 | A * | 6/1987 | Holt | F02F 7/0085 123/193.6 |
| 4,928,578 | A * | 5/1990 | Rhodes | F16J 1/14 123/193.6 |
| 4,986,167 | A * | 1/1991 | Stratton | F01P 3/18 123/193.6 |
| 5,000,078 | A | 3/1991 | Gabele | |
| 5,035,210 | A | 7/1991 | Arai et al. | |
| 5,085,185 | A * | 2/1992 | Heshmat | 123/193.6 |
| 6,286,414 | B1 | 9/2001 | Kruse | |
| 6,478,003 | B2 | 11/2002 | Laimbock | |
| 6,729,291 | B1 * | 5/2004 | Scharp et al. | 123/193.6 |
| 7,299,772 | B1 * | 11/2007 | Hardin | F02F 3/22 123/193.1 |
| 7,654,240 | B2 | 2/2010 | Jarrett et al. | |
| 8,631,573 | B2 * | 1/2014 | Scharp et al. | 29/888.04 |
| 8,671,905 | B2 * | 3/2014 | Scharp et al. | 123/193.6 |
| 2002/0046593 | A1 * | 4/2002 | Ribeiro | B23P 15/10 72/377 |
| 2002/0133946 | A1 | 9/2002 | Scharp et al. | |
| 2005/0072394 | A1 * | 4/2005 | Gabriel et al. | 123/193.6 |
| 2005/0283976 | A1 * | 12/2005 | Otaka | 29/888.04 |
| 2006/0037471 | A1 * | 2/2006 | Zhu | F02F 3/0084 92/173 |
| 2008/0134879 | A1 | 6/2008 | Hofbauer | |
| 2008/0307958 | A1 | 12/2008 | Scharp | |
| 2009/0173309 | A1 | 7/2009 | Ottiliczky et al. | |
| 2010/0258064 | A1 | 10/2010 | Rebello | |
| 2010/0275873 | A1 * | 11/2010 | Gniesmer | B23K 20/129 123/193.6 |
| 2011/0107997 | A1 * | 5/2011 | Muscas | F02F 3/003 123/193.6 |
| 2011/0197845 | A1 * | 8/2011 | Flowers et al. | 123/193.6 |
| 2012/0037115 | A1 * | 2/2012 | Schnaiter et al. | 123/193.6 |
| 2012/0160204 | A1 * | 6/2012 | Scharp et al. | 123/193.6 |
| 2013/0014722 | A1 * | 1/2013 | Scharp et al. | 123/193.6 |
| 2013/0047948 | A1 * | 2/2013 | Heuschmann | 123/193.6 |
| 2013/0206096 | A1 * | 8/2013 | Hampton | F16J 9/20 123/193.6 |
| 2015/0275820 | A1 * | 10/2015 | Mackey | F02F 3/003 123/445 |

FOREIGN PATENT DOCUMENTS

| | | | |
|---|---|---|---|
| CN | 101793205 A | | 8/2010 |
| DE | 2000249 A1 | | 9/1971 |
| DE | 2613059 A | | 6/1977 |
| DE | 102004038945 A1 | | 2/2006 |
| FR | 2901577 A3 | | 11/2007 |
| JP | S52092034 A | | 8/1977 |
| JP | S55108232 U | | 7/1980 |
| JP | S5981758 U | | 6/1984 |
| JP | S60134851 U | | 9/1985 |
| JP | 01211658 A | * | 8/1989 |
| JP | H04265451 A | | 9/1992 |
| JP | 2007270813 A | | 10/2007 |
| WO | 2007115790 A1 | | 10/2007 |
| WO | 2013086297 A1 | | 6/2013 |

* cited by examiner

PISTON WITH ENHANCED COOLING GALLERY

BACKGROUND OF THE INVENTION

1. Technical Field

This invention relates generally to internal combustion engines, and more particularly to pistons therefor.

2. Related Art

Engine manufacturers are encountering increasing demands to improve engine efficiencies and performance, including, but not limited to, improving fuel economy, improving fuel combustion, reducing oil consumption, increasing the exhaust temperature for subsequent use of the heat within the vehicle, increasing compression loads within the cylinder bores, decreasing weight and making engines more compact. Accordingly, it is desirable to increase the temperature and compression loads within the combustion chamber of the engine. However, by increasing the temperature and compression loads within the combustion chamber, the wear and physical demands on the piston are increased, thereby reducing its potential useful life. A particular area of concern is with the excessive heat buildup and associated wear within the upper combustion surface region and piston ring region of the piston.

A piston constructed in accordance with this invention is able to better withstand the excessive heat generated in modern high performance engines, as will become apparent to those skilled in the art upon reading the disclosure and viewing the drawings herein.

SUMMARY OF THE INVENTION

A piston for an internal combustion engine is provided. The piston includes a body having a cylindrical outer surface with an annular uppermost ring groove and a lower ring groove extending into the outer surface. A top land extends from the uppermost ring groove to an upper combustion surface. The body has a pair of pin bosses with pin bores aligned with one another along a pin bore axis. A first piston ring is disposed in the uppermost ring groove and a second piston ring is disposed in the lower ring groove. The body has an annular sealed cooling gallery with a cooling medium contained therein. The sealed cooling gallery is configured in substantial radial alignment between the first and second piston rings. As such, the sealed cooling chamber is configured to optimize the cooling effect of the coolant medium contained therein on the upper combustion surface and the ring belt region. Accordingly, the piston is able to attain an enhanced useful life.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
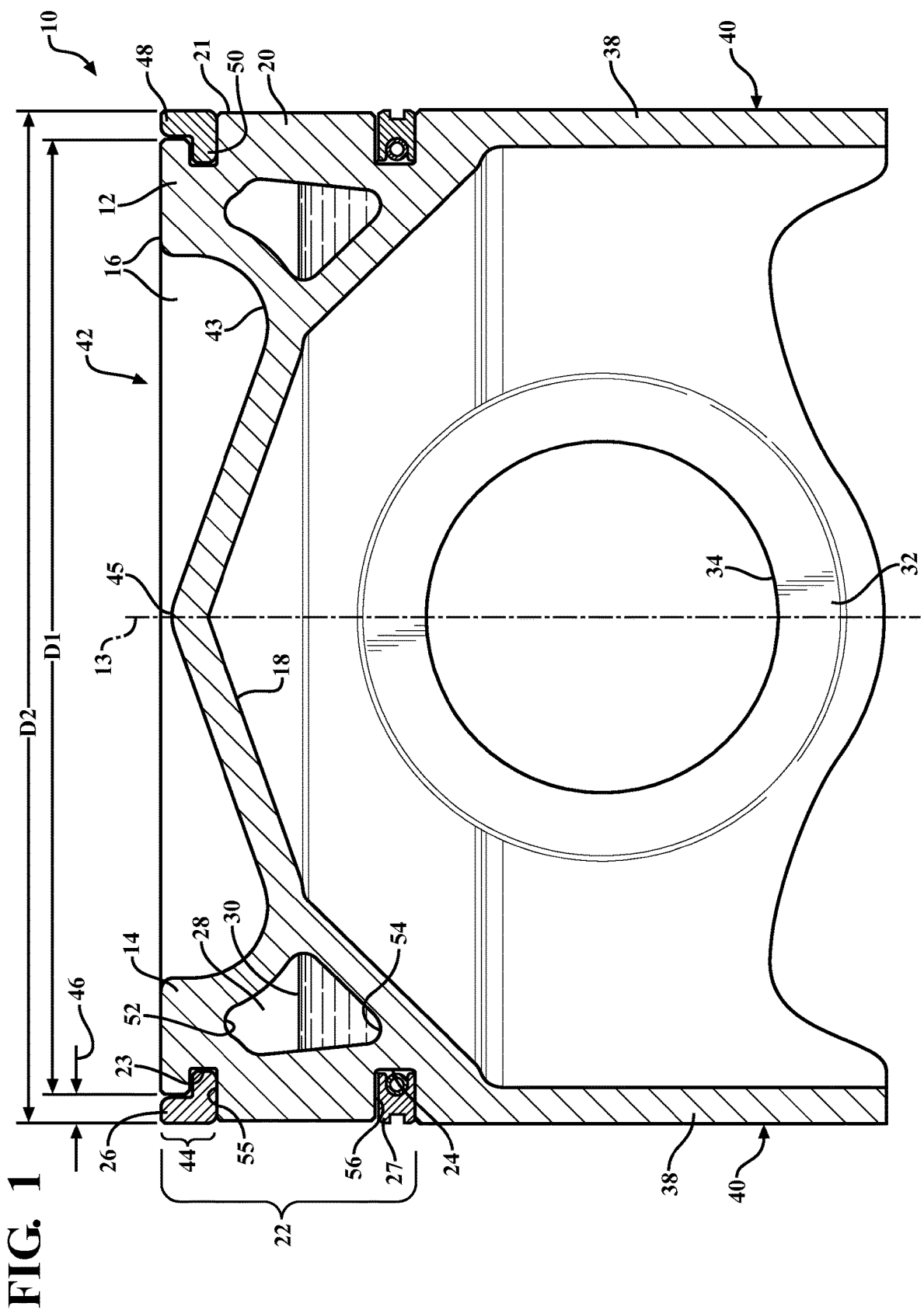
FIG. 1 is a cross-sectional view taken generally transverse to a pin bore axis of a piston constructed in accordance with one aspect of the invention.
Figure 2:
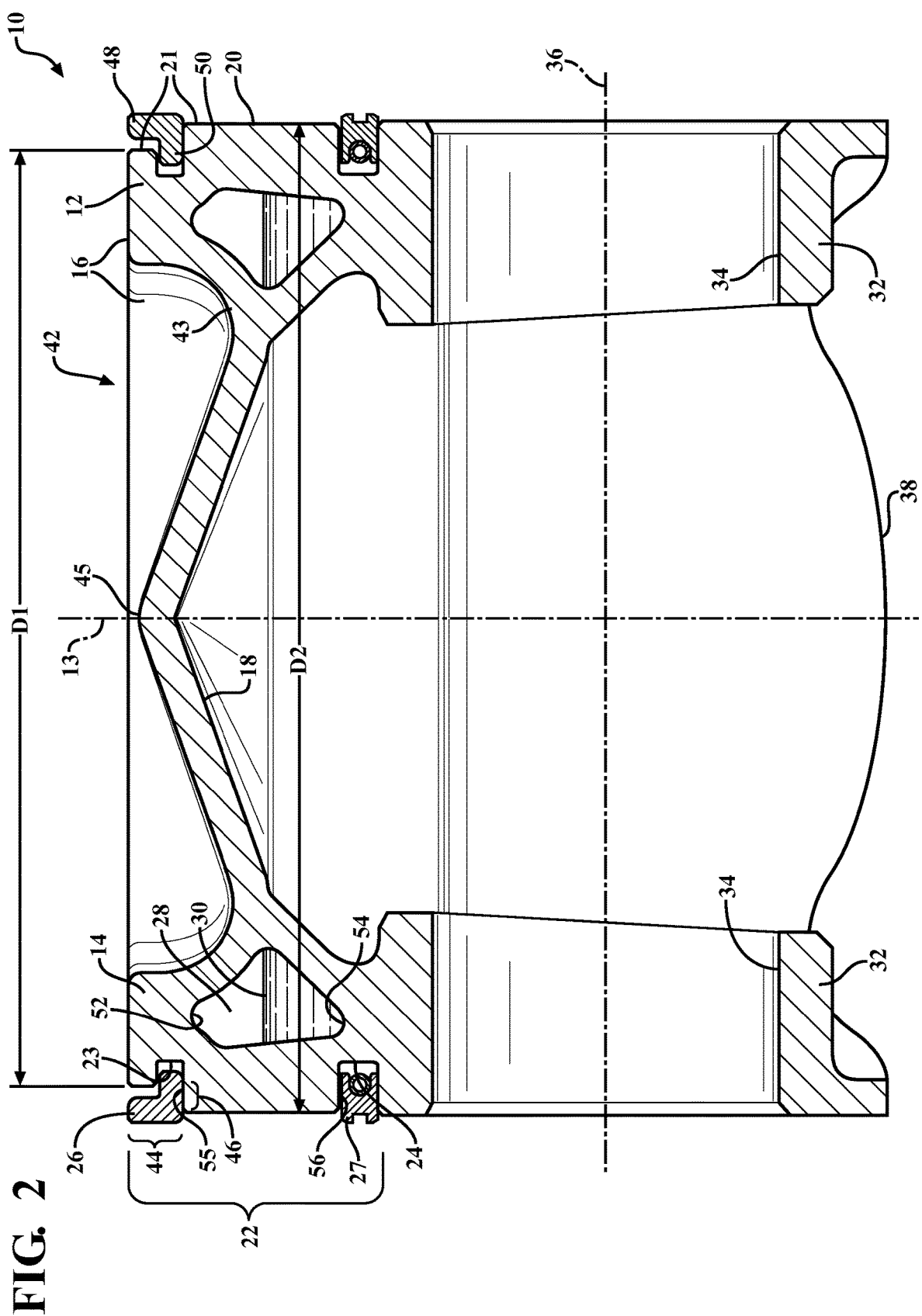
FIG. 2 is a cross-section view of the piston of FIG. 1 taken generally along the pin bore axis.

Referring in more detail to the drawings, FIGS. 1 and 2 illustrate a cross-sectional view of a piston 10 constructed in accordance with one presently preferred aspect of the invention for reciprocating movement in a cylinder bore of an internal combustion engine, such as a modern, compact, high performance vehicle engine, for example. The piston 10 has a body 12, such as a single, monolithic piece of cast material or formed from either forged or billet materials, by way of example and without limitation, extending along a central longitudinal axis 13 along which the piston 10 reciprocates in the cylinder bore. The body 12 has an upper combustion wall 14 having on one side an upper combustion surface 16 configured for direct exposure to combustion gases within a cylinder bore and on an opposite side an undercrown surface 18 located axially beneath a portion of the upper combustion surface 16. The piston body 12 also includes a generally cylindrical outer wall 20 having a cylindrical outer surface 21 depending from the upper combustion surface 16 over a ring belt region 22 immediately adjacent the upper combustion surface 16. The ring belt region 22 includes an uppermost ring groove 23 and a lower ring groove, shown as a lowermost ring groove 24. Each of the ring grooves 23, 24 are configured for receipt of first and second piston rings 26, 27 therein, respectively. Further, the piston body 12 is formed having a closed cooling gallery 28 with a cooling medium 30 disposed and contained therein. The cooling gallery 28 is configured radially inwardly and in substantial radial alignment with the ring belt region 22. The cooling gallery 28 is configured in accordance with the invention to enhance the transfer of heat from the upper combustion surface 16 and ring belt region 22 to the cylinder liner and engine block. Accordingly, heat generated within the upper combustion wall 14 and ring belt region 22 is ultimately transferred to the cylinder liner and engine block, thereby facilitating reduction of the operating temperature of the piston 10, and thus, enhancing the useful life of the piston 10.

The cooling medium 30 can be provided entirely as a metallic coolant, which is liquid at operating temperature of the piston 10. Any suitable lightweight metallic material could be used, taking into account the heat transfer coefficient desired. Further, the cooling medium 30 can be provided as a liquid metal mixed with powdered metal, such as copper or aluminum. The addition of metallic powder can be used particularly when it is desired to raise the heat transfer properties of the cooling medium 30. Further yet, heat transfer liquids, such as those typically used for industrial heat exchanging, can be used.

As best shown in FIG. 2, the piston body 12 has a pair of pin bosses 32 depending from the undercrown surface 18 to provide laterally spaced pin bores 34 coaxially aligned along a pin bore axis 36 that extends generally transverse to the central longitudinal axis 13. The pin bosses 32 are joined to laterally spaced skirt portions 38 that are diametrically spaced from one another across opposite sides the pin bore axis 36 and have convex outer surfaces 40 contoured for sliding movement within the cylinder bore to facilitate maintaining the piston 10 in its desired orientation as it reciprocates within the cylinder bore.

The upper combustion surface 16 is represented as having a recessed combustion bowl 42 depending from a planar uppermost portion of the upper combustion surface 16 to a lowermost annular valley 43 extending about a raised central peak 45 to provide a desired gas flow within the cylinder bore. At least in part due to the combustion bowl 42, relatively thin regions of piston body material are formed between the combustion bowl 42, the cooling gallery 28 and the undercrown surface 18.

The outer wall 20, by way of example and without limitation, is shown as extending downwardly from the upper combustion surface 16 having a diameter D1 that is reduced from a maximum diameter D2 of the ring belt region 22, which depends from an upper land region 44. As such, an annular gap or space 46 is provided for receipt of a first portion 48 of the generally L-shaped first piston ring 26 between the outer surface 21 and the cylinder liner. The diameter D1 is sized so that the first portion 48 of the piston ring 26 is free to float between the upper land region 44 and the cylinder liner, thereby being able to automatically find its desired sliding orientation. To further accommodate and locate the first piston ring 26, the annular ring groove 23 extends radially inwardly into the reduced diameter outer wall 20 of the upper land region 44, wherein the ring groove 23 is sized for receipt of a laterally extending second portion 50 of the generally L-shaped first piston ring 26. The ring groove 23 is sized so that the second portion 50 of the first piston ring 26 is free to float therein, thereby further allowing the piston ring 26 to automatically find its desired sliding orientation during reciprocating movement of the piston 10.

With the first piston ring 26 being generally L-shaped, the first portion 48 provides the upstanding or vertically extending leg of the L-shaped configuration and the second portion 50 provides the laterally or horizontally extending leg of the L-shaped configuration. As discussed above, the first portion 48 is received in the annular space 46 and the second portion 50 is received in the ring groove 23.

The second piston ring 27 is spaced axially downwardly from the first piston ring 26, and is represented as a wiper ring to facilitate wiping oil from the liner back to the crankcase. The outer surface 21 extending between the first and second piston rings 26, 27 is continuous and uninterrupted, thus, being free of any ring grooves between the uppermost ring groove 23 and lower ring groove, shown as being a lowermost ring groove 24. Accordingly, the piston 10 has only the two ring grooves 23, 24 and correspondingly piston rings 26, 27. It is to be understood that the concept discussed herein also covers the traditional 3 ring piston package, 2 rings being the preferred embodiment.

The cooling gallery 28 extends between the ring grooves 23, 24, thereby facilitating cooling of the entire ring belt region 22 as well as the portion valley region 43 of the combustion bowl 42 and the uppermost planar region of the upper combustion surface 16. In particular, the cooling gallery 28 extends upwardly to an uppermost peak or surface 52 and downwardly to a lowermost valley or surface 54. The uppermost surface 52 is shown as being radially aligned with a planar lowermost surface 55 of the uppermost ring groove 23 and the lowermost surface 54 is shown as being radially aligned with an uppermost planar surface 56 of the lower ring groove 24.

Figure 3:
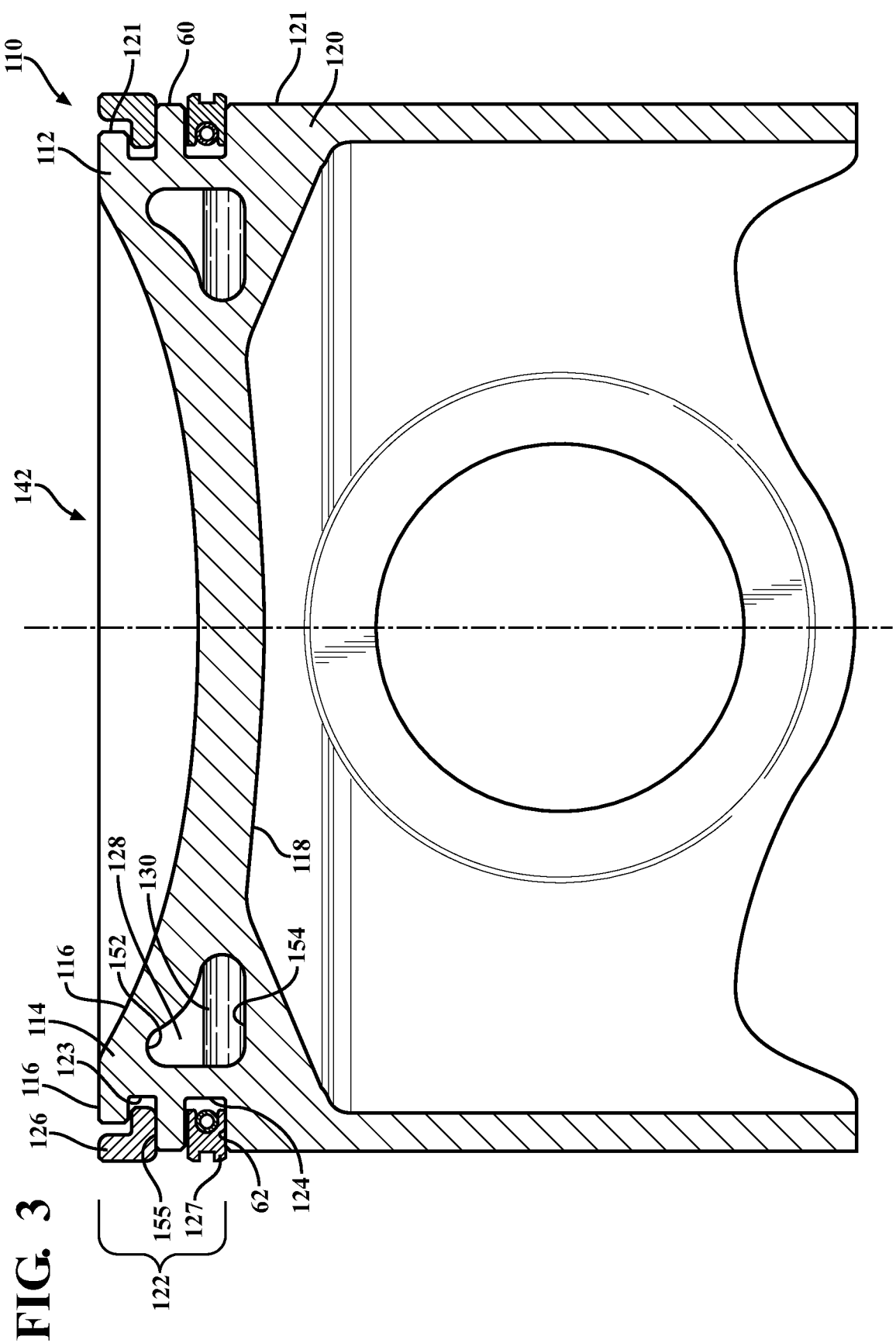
FIG. 3 is a cross-sectional view taken generally transverse to a pin bore axis of a piston constructed in accordance with another aspect of the invention.

FIG. 3 illustrates a cross-sectional view of a piston 110 constructed in accordance with one presently preferred aspect of the invention, wherein the same reference numerals as above, offset by a factor of 100, are used to identify like features discussed above. The piston 110 has a body 112, an upper combustion wall 114 having an upper combustion surface 116 and an undercrown surface 118, as discussed above. The piston body 112 also includes a generally cylindrical outer wall 120 having a cylindrical outer surface 121 depending from the upper combustion surface 116 over a ring belt region 122. The ring belt region 122 includes an uppermost ring groove 123 and a lower ring groove, shown as a lowermost ring groove 124. Each of the ring grooves 123, 124 are configured for receipt of first and second piston rings 126, 127 therein, respectively. Further, the piston body 12 has a closed cooling gallery 128 with a cooling medium 130 disposed and contained therein. The cooling gallery 128 is configured radially inwardly and in substantial radial alignment with the ring belt region 122.

The upper most ring groove 123 is configured as discussed above, however, the lowermost ring groove 123 is moved axially upwardly, such that a relatively thin annular flange 60 of piston body material having a thickness approximately the thickness of the second piston ring 127 is formed between the ring grooves 123, 124. Accordingly, the ring belt region 122 has a reduced axial length in comparison with the ring belt region 22.

In further contrast to the piston 10, the combustion bowl 142 has a full concave surface, and thus, does not have a central peak. Further yet, the cooling gallery 128, as with the first embodiment, extends upwardly to an uppermost peak or surface 152 and downwardly to a lowermost surface 154, wherein the uppermost surface 152 is shown as being radially aligned with a planar lowermost surface 155 of the uppermost ring groove 123. However, in contrast to the first embodiment, the lowermost surface 154 is shown as extending below a lowermost planar surface 62 of the lower ring groove 124. Accordingly, the cooling gallery 128 extends across the full axial width of the lowermost piston ring groove 124.

Obviously, given the detailed description of presently preferred embodiments discusses above, many modifications and variations of the present invention are possible in light of the above teachings. It is, therefore, to be understood that within the scope of the appended claims, the invention may be practiced otherwise than as specifically described.

What is claimed is:

1. A piston for an internal combustion engine, comprising:
   a body with a cylindrical outer surface with an annular uppermost ring groove and a lowermost ring groove extending into said outer surface, said outer surface being free of any ring grooves between said uppermost and lowermost ring grooves, and a top land extending from said uppermost ring groove to an upper combustion surface having a combustion bowl recessed therein, said body having a pair of pin bosses with pin bores aligned with one another along a pin bore axis, said pin bosses having radially outwardly, oppositely facing surfaces generally aligned axially with said cylindrical outer surface of said body;
   a first piston ring disposed in said uppermost ring groove;
   said first piston ring being L-shaped with a vertically extending leg that is flush with said upper combustion surface of said body;
   a second piston ring disposed in said lowermost ring groove;
   said body having an annular sealed cooling gallery with a cooling medium disposed and sealed therein, said sealed cooling gallery extending between said first and second piston rings and having generally the same shape as viewed both in cross-section looking along said pin bore axis and looking generally transverse to said pin bore axis;

wherein said annular sealed cooling gallery extends radially inwardly and directly underneath a portion of said combustion bowl; and said annular sealed cooling gallery having an uppermost surface that is radially aligned with a portion of said uppermost ring groove.

2. The piston of claim 1 wherein said top land is recessed radially inwardly from said outer surface.

3. The piston of claim 1 wherein said uppermost ring groove has a lowermost surface, said sealed cooling gallery has a lowermost surface, said uppermost surface of said sealed cooling gallery being substantially radially aligned with said lowermost surface of said uppermost ring groove and said lowermost surface of said sealed cooling gallery extending below said lowermost ring groove.

4. The piston of claim 1 wherein said cylindrical outer surface extending between said uppermost and lowermost ring grooves has an axially extending first thickness and said second piston ring has an axially extending second thickness, said first thickness being about the same as said second thickness.

5. A piston for an internal combustion engine, comprising:
a body with a cylindrical outer surface with an annular uppermost ring groove and a lowermost ring groove extending into said outer surface, said outer surface being free of any ring grooves between said uppermost and lowermost ring grooves, and a top land extending from said uppermost ring groove to an upper combustion surface having a combustion bowl recessed therein, said body having a pair of pin bosses with pin bores aligned with one another along a pin bore axis, said pin bosses having radially outwardly, oppositely facing surfaces generally aligned axially with said cylindrical outer surface of said body;

a first piston ring disposed in said uppermost ring groove;
said first piston ring being L-shaped with a vertically extending leg that is flush with said upper combustion surface of said body;
a second piston ring disposed in said lowermost ring groove;
said body having an annular sealed cooling gallery with a cooling medium disposed and sealed therein, said sealed cooling gallery extending between said first and second piston rings;
wherein said uppermost ring groove has a lowermost surface and said lowermost ring groove has an uppermost surface, said sealed cooling gallery has an uppermost surface and a lowermost surface, said uppermost surface of said sealed cooling gallery being substantially radially aligned with said lowermost surface of said uppermost ring groove and said lowermost surface of said sealed cooling gallery being substantially radially aligned with said uppermost surface of said lowermost ring groove; and
wherein said annular sealed cooling gallery extends radially inwardly and directly underneath a portion of said combustion bowl.

6. The piston of claim 5 wherein said cooling gallery has generally the same shape as viewed both in cross-section looking along said pin bore axis and looking generally transverse to said pin bore axis.

7. A piston for an internal combustion engine, comprising:
a body with a cylindrical outer surface with an annular uppermost ring groove and an annular lowermost ring groove, and a top land extending from said uppermost ring groove to an upper combustion surface having a combustion bowl recessed therein, said body having a pair of pin bosses with pin bores aligned with one another along a pin bore axis;
a first piston ring disposed in said uppermost ring groove;
said first piston ring being L-shaped with a vertically extending leg that is flush with said upper combustion surface of said body;
a second piston ring disposed in said lowermost ring groove;
said body having an annular sealed cooling gallery with a cooling medium disposed and sealed therein, said sealed cooling gallery extending in radial alignment with said uppermost ring groove and extending below said lowermost ring groove and having generally the same shape as viewed both in cross-section looking along said pin bore axis and looking generally transverse to said pin bore axis;
wherein said annular sealed cooling gallery extends radially inwardly and directly underneath a portion of said combustion bowl; and
said annular sealed cooling gallery having an uppermost surface that is radially aligned with a portion of said uppermost ring groove.

8. The piston of claim 7 wherein said cylindrical outer surface is free of any ring grooves between said uppermost and lowermost ring grooves.

9. The piston of claim 8 wherein said cylindrical outer surface extending between said uppermost and lowermost ring grooves has an axially extending first thickness and said second piston ring has an axially extending second thickness, said first thickness being about the same as said second thickness.

10. The piston of claim 7 wherein said pin bosses have radially outwardly, oppositely facing surfaces generally aligned axially with said cylindrical outer surface of said body.

11. A piston for an internal combustion engine, comprising:
a body with a cylindrical outer surface with an annular uppermost ring groove and an annular lowermost ring groove extending into said outer surface, said cylindrical outer surface being free of any ring grooves between said uppermost and lowermost ring grooves, and a top land extending from said uppermost ring groove to an upper combustion surface, said top land being recessed radially inwardly from said cylindrical outer surface, said body having a pair of pin bosses with pin bores aligned with one another along a pin bore axis;
a generally L-shaped first piston ring having a first portion configured for receipt in said uppermost ring groove and a second portion configured to extend upwardly from said uppermost ring groove along said top land to a top that is flush with said upper combustion surface of said body;
a second piston ring disposed in said lowermost ring groove;
said upper combustion surface having a combustion bowl depending therein, said combustion bowl having an annular lowermost valley and a raised peak, said annular lowermost valley extending below said annular uppermost ring groove;
said body having an annular sealed cooling gallery with a cooling medium disposed and sealed therein, said sealed cooling gallery having an uppermost surface extending above said annular lowermost valley of said combustion bowl and having a lowermost surface extending below said annular lowermost valley;

wherein said annular sealed cooling gallery extends radially inwardly and directly underneath a portion of said combustion bowl; and wherein said uppermost surface of said sealed cooling gallery is radially aligned with a portion of said uppermost ring groove.

12. The piston of claim 11 wherein said annular sealed cooling gallery has generally the same shape as viewed both in cross-section looking along said pin bore axis and looking generally transverse to said pin bore axis.

13. The piston of claim 11 wherein said pin bosses have radially outwardly, oppositely facing surfaces generally aligned axially with said cylindrical outer surface of said body.

14. The piston of claim 11 wherein said second portion of said first piston ring extends into generally flush relation with the upper combustion surface.

15. The piston of claim 14 wherein said second portion of said first piston ring has a generally straight cylindrical outer surface configured for sliding engagement with a cylinder liner.

16. The piston of claim 11 wherein said raised peak of said combustion bowl is below said upper combustion surface.

17. The piston of claim 11 wherein said uppermost ring groove has a lowermost surface and said lowermost ring groove has an uppermost surface, said uppermost surface of said sealed cooling gallery being substantially radially aligned with said lowermost surface of said uppermost ring groove and said lowermost surface of said sealed cooling gallery being substantially radially aligned with said uppermost surface of said lowermost ring groove.

* * * * *